United States Patent Office 3,391,302
Patented July 2, 1968

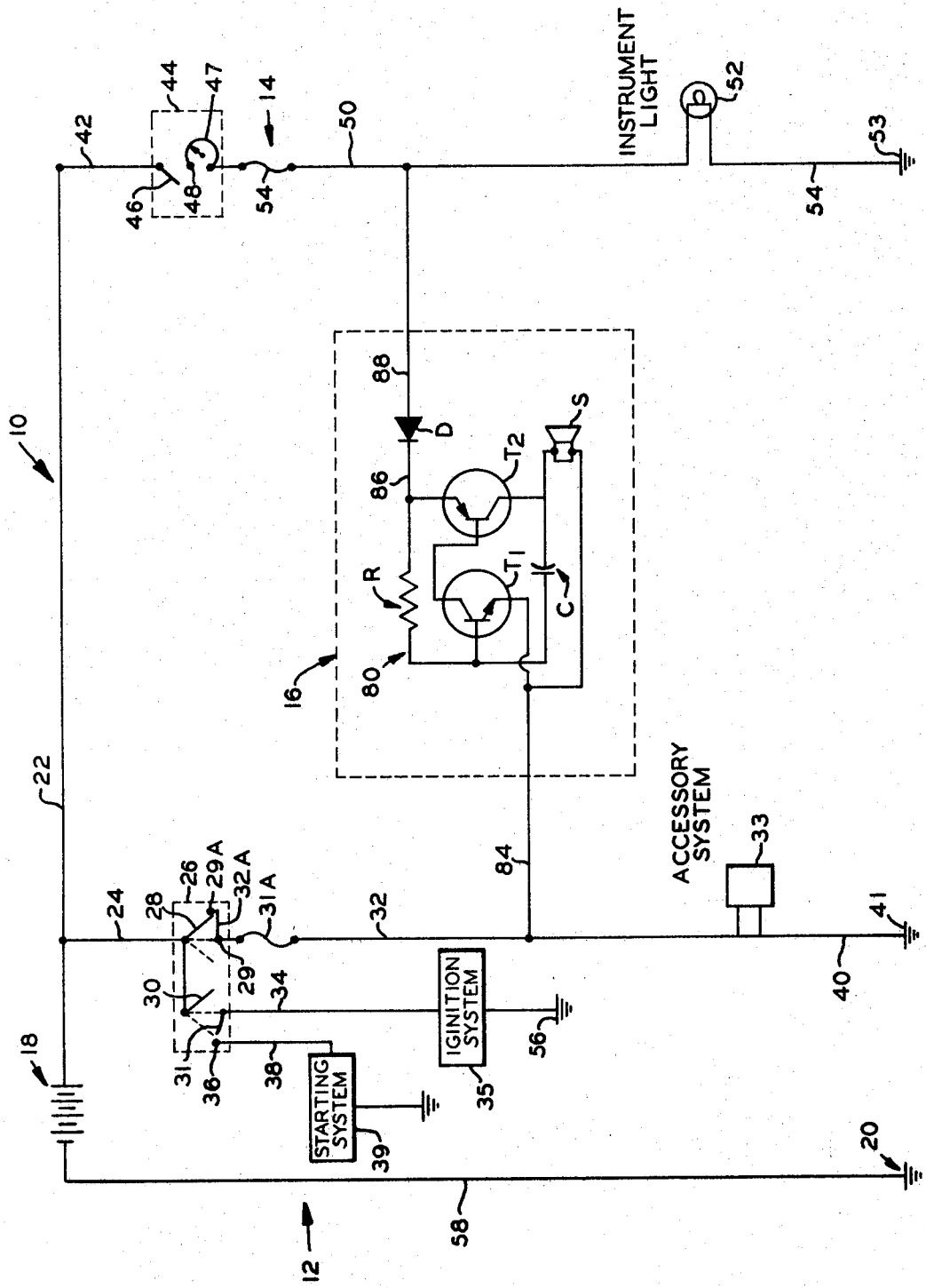

3,391,302
WARNING CIRCUIT FOR HEADLAMPS THAT REMAIN CONNECTED AFTER THE IGNITION CIRCUIT IS DISCONNECTED
Herbert B. Weingarden, 5610 Bent Oak, Sylvania, Ohio 43560
Filed Feb. 8, 1967, Ser. No. 614,705
4 Claims. (Cl. 315—83)

ABSTRACT OF THE DISCLOSURE

Vehicle lighting and ignition circuits with a signaling circuit connected therebetween. The signaling circuit including an electrically energized signaling device connected in series with a diode with the signaling circuit being connected in the ignition circuit between the ignition switch and ground and connected in the lighting circuit between the light switch and a vehicle light with the diode arranged so that current can flow from the light circuit through the signaling circuit to ground through the ignition circuit.

Background of the invention

This invention relates generally to a vehicle ignition and lighting circuit and more particularly to such a circuit including therein a signaling circuit which indicates when the lighting circuit is closed and the vehicle ignition switch is open.

The electrical systems of modern internal combustion engined vehicles utilize a storage battery for their source of electrical energy. If the battery is discharged, that is, depleted of its electrical charge, the vehicle operator is greatly inconvenienced since the starting motor of the internal combustion engine is powered by electrical energy. Thus the operator must obtain a replacement battery or an auxiliary electrical energy source in order to energize the starting motor and start the engine or else he must resort to the extremely dangerous manner of starting the vehicle commonly referred to as "pushing." The latter method is often not feasible, especially when the vehicle is equipped with an automatic transmission. Accordingly not only may the operator be inconvenienced by a discharged battery, but if the vehicle is in a remote location the operator may be stranded.

A frequent cause of a discharged battery results from a negligent omission on the part of the operator in failing to open the vehicle light circuit the previous time the vehicle was used, for, if the light circuit remains open an appreciable time with the vehicle engine and generating system inoperative, the battery can be depleted of its charge. Additionally, in cold weather, if it is dark so that the operator turns on the vehicle light for the convenience of finding the ignition switch, and fails to extinguish the light prior to attempting to start the vehicle, the drain of the light circuit on the battery may render it unable to simultaneously energize the starting motor sufficiently to start the cold vehicle engine.

Thus, it is an object of this invention to provide a vehicle ignition and lighting system which will signal to the vehicle driver if the vehicle lighting circuit is closed at such time when the ignition switch is open.

Other objects, features and advantages of the present invention will become apparent when the following description is taken in connection with the accompanying drawing.

Brief description of the drawing

The drawing shows a schematic circuit diagram illustrating a system embodying the features of this invention.

Description of the preferred embodiment

Referring to the drawing, a portion of a vehicle electrical system is shown generally at 10 and includes a portion of an ignition circuit 12, a portion of the vehicle lighting circuit 14 and a signaling circuit 16. A battery 18 is connected to ground at 20, and has a lead 22 which ultimately extends to the ignition and lighting circuits 12 and 14.

The ignition circuit 12 includes an ignition lead 24 extending to a compound ignition switch 26. The particular ignition switch 26 shown is functionally illustrative of a common type of ignition switch utilized today and includes an open or off position, shown in full lines, an on or first closed position and a start or second closed position. More particularly, the ignition switch 26 includes switches 28 and 30 which are movable unitarily. The switch 28 is the accessory switch and is adapted to be closed and contact a contractor 29 thereby connecting the ignition lead 24 to the accessory lead 32 leading to the accessory system portion 33 of the ignition circuit 12. Between the accessory portion 33 and the contact 29, a fuse 31A is interposed in the lead 32. The switch 30 has a first closed position wherein it contacts an elongated contactor 31 and thereby connects the lead 24 to a lead 34 connected to the contactor 31 and leading to the vehicle ignition system portion 35 of the ignition circuit 12 and a second closed position wherein the switch 30 contacts a contactor 36 as well as the contactor 31. Since the contactor 31 is elongated, the switch 30 remains in contact therewith in both its first and second closed positions and also while between these positions. The contact 36 is supplied with a lead 38 extending to the starting system portion 39 of the ignition circuit.

The switches 28 and 30 of the compound ignition switch 26 move unitarily, so that when the ignition switch is in its off or open position, as shown in full lines, both the switches 26 and 30 are open; when the ignition switch is in its first closed or on position (clockwise from its off position) the switch 26 contacts the contactor 29 while the switch 30 contacts the contactor 31, and both the ignition system and accessory system are energized. When the ignition switch is in its second closed or start position, (clockwise from its first closed position) the switch 28 moves past the contactor 29 and is open while the switch 30 engages both the contactors 31 and 36 to energize the starting circuit; in this latter position, while the starting system is being energized, the switch 26 to the accessory system is open. The switch 26 is normally spring biased by a spring (not shown) to return from its second closed to its first closed position. The switches 28 and 30 can also be rotated counterclockwise from the off position to an accessory system only position so that the switch 26 engages a contactor 29A connected by a lead 32A to the accessory lead 32, while the switch 30 does not engage any contactors. In this position, only the accessory system is energized.

A lead 40 connects from the accessory system 33 to ground at 41, and is always connected to the lead 32, because certain of the accessories (such as the fuel gauge, oil pressure gauge) provide such a continuous ground, even though other of the accessories (such as the radio) may not provide a connection to ground when turned off.

The vehicle lighting circuit 14 is connected to the battery lead 22 by a lead 42 and includes a compound switch 44 connected to the lead 42. The compound switch 44 includes switches 46 and 47. The switch 46 has an open position shown in full lines and a closed position wherein the switch 46 engages a contactor 48 thereby connecting the lead 42 to a lead 50, through the switch 47; the lead 50 being connected to the switch 47 and leading to the vehicle instrument lights indicated generally at 52 and the lights being connected to ground at 53 by a lead 54. Between the switch 44 and the instrument lights 52, a fuse 54 is interposed in the lead 52. The fuse 54 and the fuse 31A are usually disposed in a fuse box or board (not shown) so that portions of the leads 32 and 50 are close to each other at this location.

The compound switch 44, in addition to the switch 46, also includes a third switch means (not shown) for energizing the vehicle parking lights and taillights in a first position, and for energizing the vehicle headlights and taillights in a second position. In both these first and second positions, the switch 46 engages the contact 48 for energizing the instrument lights, while when this third switch means is in its open position, the switch 46 is also in its open position. The switch 47 is of the rheostat type and connected serially with the switch 46, so that once the switch 46 is closed, the switch 47 can be manipulated to brighten and dim the instrument lights and even manipulated to an open or off position when the headlights are on.

The signaling circuit 16 includes signal means, shown generally at 80, responsive to a difference in electrical potential for providing a signal and means, in the form of a diode D connected serially with the signal means for controlling the direction of current flow through the signal means. More particularly, the signal means 80 includes: an oscillating means in the form of a first transistor $T_1$; an amplifying means in the form of a second transistor $T_2$; a resistance means in the form of a resistor R; a capacitance means in the form of a capacitor C; and a speaker means S. These means are connected in a well known manner, as shown, so that when a current flows through the signal means, the speaker will emit an audible signal.

Values for the components of the signal means 80 which have been found to operate satisfactorily are as follows:

Transistor $T_1$ ____ GE5 made by General Electric (NPN type).
Transistor $T_2$ ____ 2N1371 made by Texas Instruments (PNP type).
Resistor R _____ 100,000 ohms.
Capacitor C _____ .05 microfarad.
Speaker S _____ 8 ohms.

The signalling means 80 is connected by a first lead 84 to the accessory lead 32 of the ignition circuit 12 at a position between the accessory system 33 and the fuse 31A and is connected by a second lead 86 to the cathode lead of the diode D; the anode of the diode D being connected by a lead 88 to the lead 50 of the lighting circuit 14 at a position between the fuse 54 and the instrument light 52. The diode D acts as a one-way flow control valve, and one which has been found satisfactory is a silicon diode 1R-5A4-D made by the International Rectifior Corp.

Accordingly, with the diode D arranged as shown, the signaling means 80 can only go to ground at 41 through the leads 84, 32 and 40 and the accessories 33, and a difference in potential will exist in the leads 84 and 86 connected to the signaling means 80 when the accessory switch 28 of the ignition circuit 12 is open and the switches 46 and 48 in the light circuit 14 are closed so that the signaling means 80 is activated. When either the switch 46 or 48 is open and the accessory switch 28 is closed, there is a difference in potential in the leads 84 and 88, however, the diode D prevents the signaling means 80 from going to ground at 53.

Thus, it is seen that the vehicle ignition system 10 will provide a signal at such time as the compound switch 44 is closed and the ignition switch 26 is in its open or off position. Since the switch 46 of the compound switch 44 is closed whenever the headlights or parking lights are on, if it is desired to light these latter lights without energizing the ignition system 38, the switch 26 can be moved to the accessory only position wherein the switch 28 engages the contactor 29A while the switch 30 is open; thereby providing a potential in the lead 32 which is the same as the potential in lead 50 and the signaling circuit 16 will not be energized.

Since the switch 48 is of the rheostat type and can be opened when the vehicle headlights and parking lights are on, it can be opened while the switch 46 is closed and the headlights or parking lights can be energized even though the switch 28 is open, and no difference in potential will exist in the leads 84 and 86.

It should also be understood that the lead 88 can be connected to the lead going to the taillights (such being a portion of the vehicle lighting system which is not shown) since such lights are energized when either the parking or taillights are on. In this instance, the operation would be the same except that to utilize the parking lights without energizing the ignition system 38, the switch 26 would have to be placed in the accessory only position. Since the switch 26 is normally key operated, this arrangement is not as desirable as the preferred embodiment for the reason that to leave the vehicle with the parking lights on requires that the key be left in the ignition switch, while in the preferred embodiment, the rheostat switch 47 need only be opened.

The lead 84 can also be connected to the lead 34 going to the ignition system 38 and the ground 56 of the latter utilized for the signaling circuit 16. However, if the vehicle engine is stopped so that the various contacts (not shown) in the ignition system 38 are open (i.e., distributor points) no connection will be provided from the lead 34 to ground and the signaling means will not be energized.

It should be understood that the grounds 20, 41, 53 and 56 all provide a conductive connection to the battery 18 through the lead 58, to complete the circuits described herein.

In conclusion, it is pointed out that while the illustrated example constitutes a practical embodiment of my invention, I do not limit myself to the exact details shown, since modifications of the same may be made without departing from the spirit and scope of the invention.

Having described the invention, I claim:

1. A vehicle electrical system comprising, source means of electrical energy including a connection to ground therefor, an ignition circuit means including a first switch means and being connected to said source means and to said ground, a lighting circuit means including a second switch means and being connected to said source means and to said ground, and a signaling circuit means conductively connected between said ignition circuit means and said lighting circuit means with the connection to said ignition circuit means being intermediate said first switch means and said ground and with the connection to said lighting circuit means being intermediate said second switch means and said ground, said signaling circuit means including a signaling means and a current directional control means, said signal means being operable upon the flow of current in either direction therethrough and said control means being serially connected with said signal means for allowing current to pass from said lighting circuit means through said signaling circuit means and to ground through said ignition circuit means when said second switch is closed and said first switch is open and for preventing current from passing from said ignition circuit means through said signaling circuit means to ground through said lighting circuit means when said first switch is closed and said second switch is open.

2. A system according to claim 1 wherein said ignition circuit means includes an ignition system means and an accessory system means, said system means being connected in parallel between said first switch means and said ground and said signaling circuit means is connected to said ignition circuit means at said accessory system means.

3. A system according to claim 2 wherein said second switch means includes a switch and a rheostat means, said switch having an open and closed position and said rheostat means having an open position, said switch and said rheostat means being serially arranged.

4. A system according to claim 3 wherein said control means is a diode.

References Cited

UNITED STATES PATENTS

| | | | |
|---|---|---|---|
| 1,909,072 | 5/1933 | Prescott | 315—83 |
| 3,040,207 | 6/1962 | Grontkowski | 315—82 X |
| 3,124,782 | 3/1964 | Norton | 315—82 X |
| 3,157,870 | 11/1964 | Marino et al. | 315—132 X |
| 3,214,730 | 10/1965 | Prewitt | 340—52 |
| 3,283,299 | 11/1966 | Savino | 315—82 X |
| 3,325,783 | 6/1967 | Webb | 315—82 X |

JAMES W. LAWRENCE, *Primary Examiner.*

C. CAMPBELL, JR., *Assistant Examiner.*